INVENTORS
H.R. LEYPOLDT
A.T. STODDART
BY
ATTORNEY

Jan. 12, 1954   H. R. LEYPOLDT ET AL   2,665,797
APPARATUS FOR ADVANCING MATERIAL
Filed April 23, 1949   2 Sheets-Sheet 2

INVENTORS
H. R. LEYPOLDT
A. T. STODDART
BY
ATTORNEY

Patented Jan. 12, 1954

2,665,797

UNITED STATES PATENT OFFICE 2,665,797

APPARATUS FOR ADVANCING MATERIAL

Harry R. Leypoldt and Adam T. Stoddart, Baltimore, Md., assignors to Western Electric Company, Incorporated, New York, N. Y., a corporation of New York Application April 23, 1949, Serial No. 89,338

5 Claims. (Cl. 198—220)

1

This invention relates to apparatus for advancing material, and more particularly to apparatus for advancing weighed material to conveying apparatus.

In some manufacturing processes, such as, for example, in compounding plastic compounds, the ingredients frequently are weighed in batches by weighing devices, and must be advanced from weigh-pans of the weighing devices to points of use thereof. Vibratory devices have been proposed in the past for vibrating weigh-pans to advance weighed material therefrom, but these vibratory devices have been deliberately weighted on the theory that excess weight was necessary to operativeness. As a result, the vibratory devices have been so heavy in proportion to the weight of the material weighed that accuracy of the weighing operation has not been so high as it might have been if the advancing devices were lighter. No advancing devices of unweighted, light weight construction for accurate weighing have been known in the past.

An object of the invention is to provide new and improved apparatus for advancing material.

A further object of the invention is to provide new and improved apparatus for weighing and advancing material.

Another object of the invention is to provide a pan type weighing and transferring device of such light construction that the weight of the weighing and transferring device is low in proportion to the material being weighed in each batch.

An apparatus illustrating certain features of the invention may include a pan, a flexible arm connected rigidly to the pan, an armature connected rigidly to the arm, electromagnetic-field-creating means connected rigidly to the arm, and means for energizing and deenergizing the field-creating means.

Figure 1:
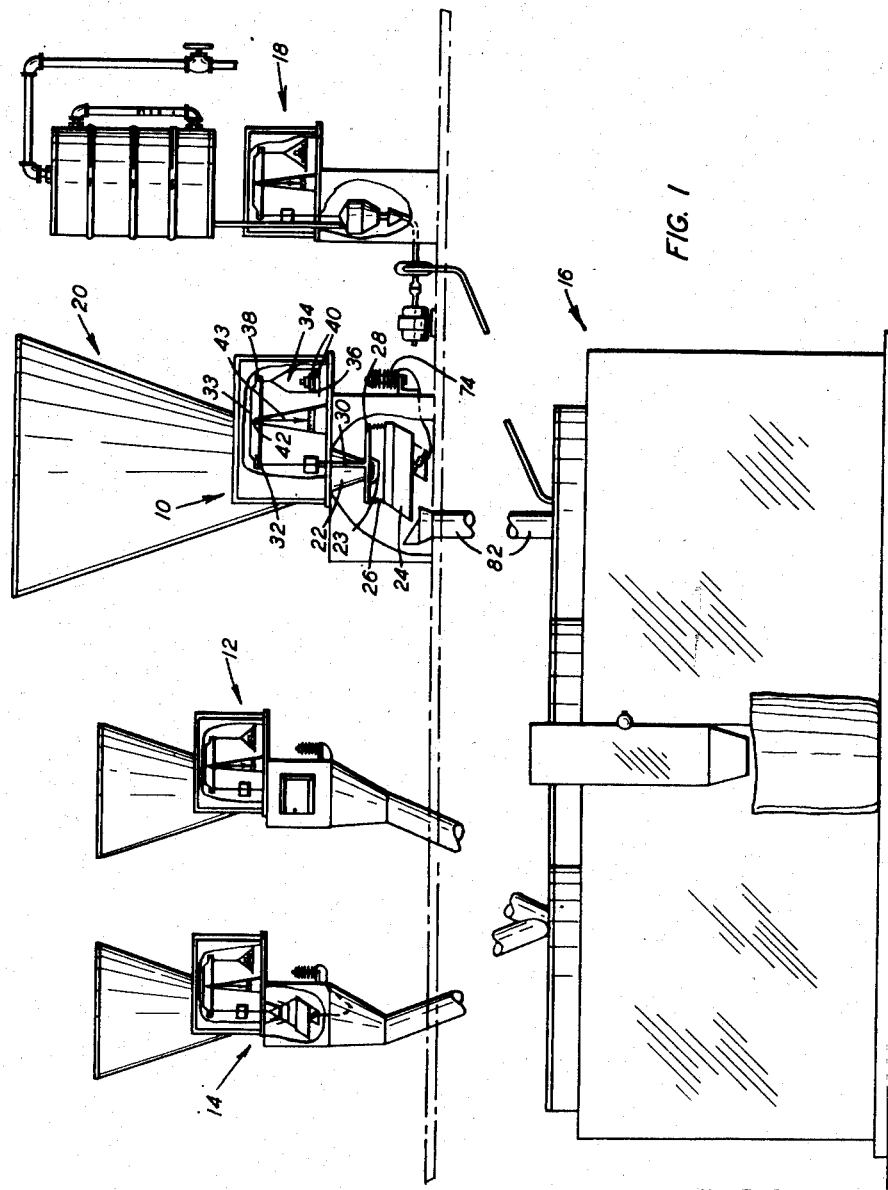
Figure 2:
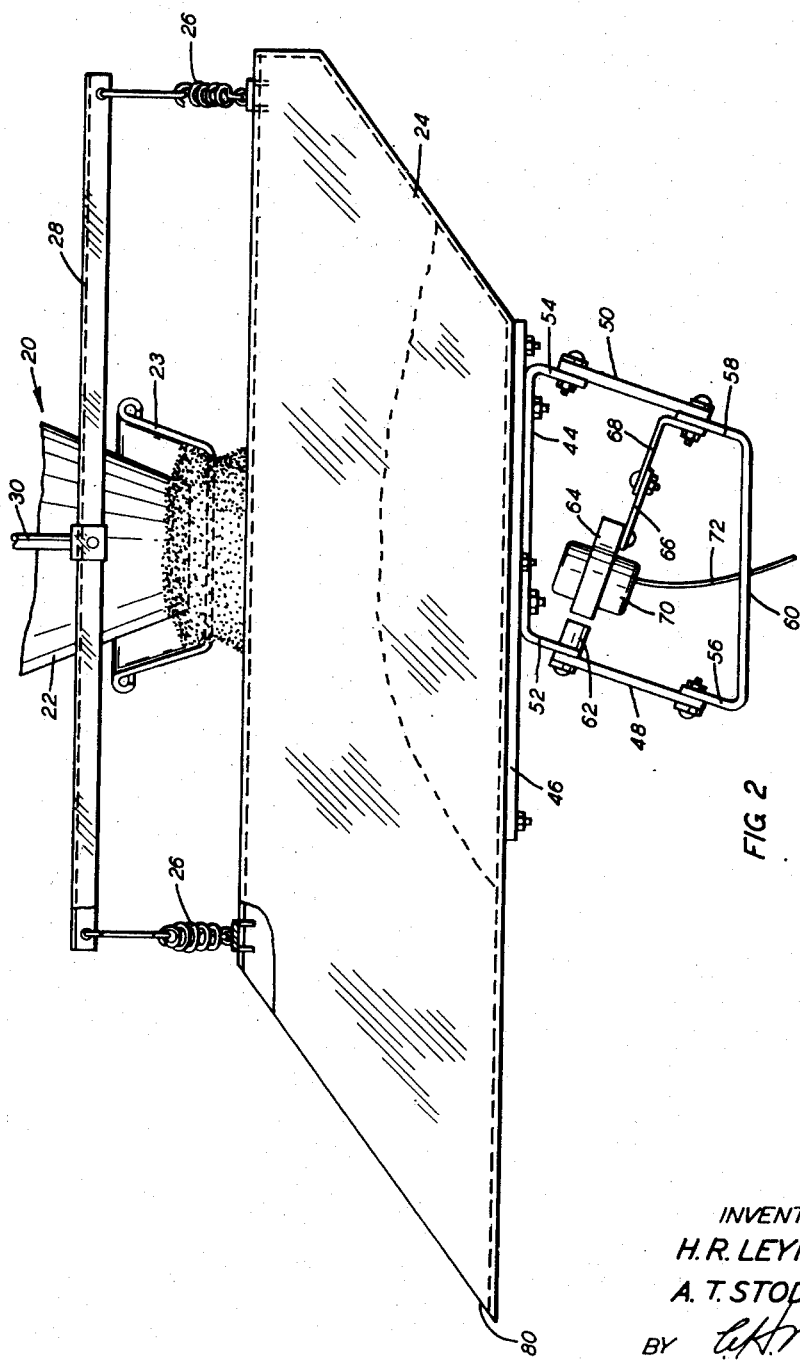

A complete understanding of the invention may be obtained from the following detailed description of an apparatus forming a specific embodiment thereof, when read in conjunction with the appended drawings, in which:

Fig. 1 is a front elevation of an apparatus forming one embodiment of the invention, and Fig. 2 is an enlarged, fragmentary, front elevation of a portion of an apparatus shown in Fig. 1.

Referring now in detail to the drawings, weighing devices 10, 12 and 14 periodically supply powdered ingredients of a thermoplastic compound to a mixer 16, which may be of the form comprising the subject matter of copending application, Serial No. 89,358, filed April 23, 1949, by C. B. Clotworthy, for "Methods of an Apparatus for Mixing Materials," now Patent No. 2,592,245, issued April 8, 1952. A metering device 18 also supplies liquid periodically to the mixer 16. Each of the devices 10, 12 and 14 is similar in construction and operation, and for simplicity of description only the weighing device 10 will be described in detail.

The weighing device 10 includes a hopper 20, which has a valve-controlled discharge spout 22. Powdered material is dropped from the spout 22 into fall-breaking pan 23 directed perpendicularly with respect to a receiving weigh-pan 24. The weigh-pan 24 is suspended by springs 26—26 from a channel 28 connected pivotally to a rod 30 supported by an arm 32 of a beam 33 forming part of a balance 34. A weight pan 36 is suspended from an arm 38 of the beam 33, and balancing weights 40—40 rest upon the pan 36. The beam 33 is mounted pivotally on an agate knife-edge 42 carried by an upright 43.

A rigid, generally U-shaped frame 44 (Fig. 2), is connected rigidly to the heel end of the pan 24 by a reinforcing plate 46. Leaf springs 48 and 50 are connected to arms 52 and 54 of the frame 44 and to arms 56 and 58 of a second rigid, generally U-shaped frame 60. A light weight soft iron armature 62 is connected rigidly to the arm 52 of the frame 44. A core 64 is connected to the arm 58 of the frame 60 by a rigid arm 66 and an L-shaped bracket 68. A coil 70 is supported by the core 64, and is connected by light weight, twisted conductors 72—72 to half-wave rectifier 74, which supplies a pulsating electrical current to the coil 70. The weigh-pan 24 is provided with a discharge end from which the material is fed to the mixer 16.

Operation

Powdered material is dropped from the hopper 20 into the pan 23, and overflows from the discharge end of the pan 23 into the weigh-pan 24. When the weigh-pan has received sufficient powdered material to equal a predetermined portion of the weights 40—40, the beam 33 moves to a level position, and actuates a suitable control system (not shown), such as the control system shown in Patent 2,100,874 to Ryan et al., to stop the flow of material from the hopper 20 and to energize the rectifier 74. When the rectifier 74 is energized, it supplies pulsating electrical current to the coil 70 varying from zero to a predetermined value and from this value back to zero at a frequency of 3600 times per minute. During each cycle of current flow through the coil 70, the armature 62 is drawn toward the core 64, and then the leaf springs 48 and 50 move these elements apart as the current dies in the coil 70.

When the armature 62 is drawn toward the core 64, the core 64 and the frame 60 are pulled upward and to the left, as viewed in Fig. 2. This pulls the pan 24 downwardly and to the right sufficiently rapidly to pull the pan slightly away from the material in the pan and to the right relative to the material. The current to the coil 70 then is cut off, the field in the core 64 and the armature 62 dies, the material drops on the pan and the springs 48 and 50 swing the pan 24 slightly to the left, and move the frame 60 and the core 64 and the coil 70 to the right.

Thus, during each cycle of the current supplied to the coil 70, the pan 24 is moved downwardly to the right with respect to the material, the material drops vertically on the pan at points on the pan slightly to the left from those which they engaged previously, the material is moved slightly to the left, and the material is fed from the discharge end 30 thereof to the mixer until all the material in the pan 24 is emptied. As the material in the pan 24 is fed therefrom and the pan is emptied, the arms 32 and 38 of the beam 33 move in a clockwise direction, as viewed in Fig. 1, due to the weights 40—40. After the pan 24 has been emptied, the current to the rectifier 74 is stopped, and the weigher 10 is ready for another weighing and delivery operation.

The assembly of elements including the weigh-pan 24 and the vibrating unit suspended therefrom has a natural frequency of vibration approaching the numerical value of, but slightly less than, the frequency at which the coil 70 is operated so hammering between the coil and armature is prevented and a high vibratory force is preserved. A natural frequency of this assembly found to give excellent results in practice is 3510 cycles per minute when the frequency of the operation of the coil is about 3600 cycles per minute. The weight of the pan 24, is low, and the combined weight of the vibration unit including the frames 44 and 60, the reinforcing plate 46, the leaf springs 48 and 50, the armature and the electromagnet is even less than that of the pan. The elements of the vibrator unit are sufficiently heavy in construction to provide only the mechanical strength and electrical characteristics necessary, and hence are unweighted. That is, no portion of any of these elements is mere ballast in contrast to the prior art vibratory devices in which the electromagnets are either deliberately weighted or are fixed to a fixed object. However, even though the weight of the electromagnet is less than that of the weigh-pan, it has sufficient weight to vibrate the pan to feed material rapidly therefrom.

In one specific example, the combined weight of the weigh-pan 24, the plate 46, the frame 44, the armature 62, and half of both the springs 48 and 50 was about 230 grams, and the combined weight of the elements forming the other inertia body, namely: the electromagnet, the frame 60, the bracket 66 and one-half of both the springs 48 and 50 was about 174 grams. Excellent delivery results were obtained even when the pan was heavily loaded although the weight of the elements causing vibration of the pan was only about 43% of the total empty combined weight while the weight of the vibrated elements was about 57% of this total.

The combined weight of all the elements suspended by the arm 32 is so small that it balances only a small portion of the weights 40—40 needed to balance these elements and weigh each batch of material. Hence, the balance 34 weighs each batch of material very accurately, it also delivers the material to the mixer rapidly after each weighing operation. The transfer unit is light and inexpensive in construction, is strong and durable, has a large capacity for each weighing operation, and serves to discharge each batch of material weighed thereby in a very short period of time. The structure of the above-described weigh-pan and vibrating mechanism is such that they may even be suspended from and used continuously with a laboratory type agate-bearing beam balance without deleterious effects on the fragile balance.

While the above-described transfer device is shown as a portion of a weighing device and is very important in such a field of use, it obviously may be used wherever conveying of materials is needed.

What is claimed is:

1. A transfer device, which consists of a pan, a generally U-shaped frame secured rigidly to the base of the pan with the arms thereof projecting away from the pan, a pair of leaf springs secured to the arms of the frame, a second generally U-shaped frame connected to the leaf springs, an armature connected to one of the U-shaped frames, an electromagnet connected to the other U-shaped frame, and means for supplying a pulsating current to the electromagnet to vibrate the pan, the weight of the pan being greater than the combined weight of said other elements.

2. A transfer device, which consists of a pan, a generally U-shaped frame secured rigidly to the base of the pan in a position thereof in which the arms project away from the pan, a pair of leaf springs secured to the arms of the U-shaped frame, a second generally U-shaped frame connected to the leaf springs, an armature connected to one of the U-shaped frames, an electromagnet connected to the other U-shaped frame, and means for supplying a pulsating current to the electromagnet to vibrate the pan.

3. A transfer device, which consists of a pan, a generally U-shaped frame secured rigidly to the base of the pan with the arms thereof projecting away from the pan, a pair of leaf springs secured to the arms of the frame, a second U-shaped frame connected to the leaf springs, an armature connected rigidly to the first-mentioned U-shaped frame, an electromagnet connected rigidly to the second-mentioned U-shaped frame, and means for supplying a pulsating current to the electromagnet to vibrate the pan, said second-mentioned frame said spring elements and the electromagnet having a total weight that is less than that of the pan.

4. A transfer device, which consists of a pan, a generally U-shaped frame secured rigidly to the base of the pan with the arms thereof projecting away from the pan, a pair of leaf springs secured to the arms of the frame, a second U-shaped frame connected to the leaf springs, an armature connected rigidly to the first mentioned U-shaped frame, an electromagnet connected rigidly to the second-mentioned U-shaped frame, and means for supplying a pulsating current to the electromagnet to vibrate the pan, the natural frequency of the springs being near to but somewhat less than the frequency of the current so that hammering between the armature and the electromagnet is prevented, said second-mentioned frame said spring elements and the electromagnet having a total weight that is less than that of the pan.

5. A transfer device, which consists of a pan, a generally U-shaped frame secured rigidly to the base of the pan with the arms thereof projecting away from the pan, a pair of leaf springs secured to the arms of the frame, a second U-shaped frame connected to the leaf springs, an armature connected rigidly to the first mentioned U-shaped frame, an electromagnet connected rigidly to the second-mentioned U-shaped frame, and means for supplying a pulsating current of about 3600 cycles per minute to the electromagnet to vibrate the pan, the natural frequency of vibration of the springs being about 3450 cycles per minute said second-mentioned frame said spring elements and the electromagnet having a total weight that is less than that of the pan.

HARRY R. LEYPOLDT.
ADAM T. STODDART.

References Cited in the file of this patent

UNITED STATES PATENTS

| Number | Name | Date |
|---|---|---|
| 1,617,301 | Reddick | Feb. 8, 1927 |
| 2,280,056 | Broekhuysen | Apr. 21, 1942 |
| 2,352,114 | Muskat | June 20, 1944 |
| 2,407,357 | Weyandt | Sept. 10, 1946 |
| 2,444,134 | Hittson | June 29, 1948 |
| 2,462,286 | Rhodes | Feb. 22, 1949 |
| 2,467,748 | Hittson | Apr. 19, 1949 |